United States Patent [19]

Kondo et al.

[11] Patent Number: 5,314,927
[45] Date of Patent: May 24, 1994

[54] POLYESTER FOAMED ARTICLES AND METHOD FOR PRODUCING THE SAME

[75] Inventors: Haruhiko Kondo; Mitsuhiro Imaizumi; Ryosuke Kamei; Hideharu Kimura, all of Kawasaki; Eiichiro Takiyama, Kamakura, all of Japan

[73] Assignee: Showa Highpolymer Co., Ltd., Tokyo, Japan

[21] Appl. No.: 48,412

[22] Filed: Apr. 20, 1993

[30] Foreign Application Priority Data

| May 13, 1992 | [JP] | Japan | 4-120786 |
| May 14, 1992 | [JP] | Japan | 4-122200 |
| May 14, 1992 | [JP] | Japan | 4-122201 |
| May 14, 1992 | [JP] | Japan | 4-122202 |
| May 14, 1992 | [JP] | Japan | 4-122203 |
| May 14, 1992 | [JP] | Japan | 4-122204 |

[51] Int. Cl.$^5$ .................................. C08G 18/00
[52] U.S. Cl. .................................. 521/159; 521/174; 521/182; 525/440
[58] Field of Search ............... 521/182, 159, 174; 525/440

[56] References Cited

U.S. PATENT DOCUMENTS

| 2,999,851 | 9/1961 | Elmer . | |
| 3,524,825 | 8/1970 | Rill, Jr. et al. . | |
| 4,166,873 | 9/1979 | Gilliam . | |
| 4,183,822 | 1/1980 | Collington | 521/182 |
| 4,224,264 | 9/1980 | Ort et al. | 521/182 |
| 4,312,960 | 1/1982 | Ort et al. | 521/182 |
| 4,588,754 | 5/1986 | Liu | 521/182 |
| 4,904,702 | 2/1990 | Allen | 521/182 |
| 5,026,736 | 6/1991 | Pontiff | 521/182 |
| 5,061,778 | 10/1991 | Uchida et al. | 528/45 |
| 5,128,383 | 7/1992 | Amano et al. | 521/182 |
| 5,229,432 | 7/1993 | Muschiatti | 521/182 |

FOREIGN PATENT DOCUMENTS

| 0323700 | 7/1989 | European Pat. Off. . |
| 0393819 | 10/1990 | European Pat. Off. . |
| 0447817 | 9/1991 | European Pat. Off. . |
| 2353531 | 5/1974 | Fed. Rep. of Germany . |
| 3810595 | 10/1989 | Fed. Rep. of Germany . |
| 1059075 | 3/1954 | France . |
| 748872 | 5/1956 | United Kingdom . |
| 2021602 | 12/1979 | United Kingdom . |

*Primary Examiner*—Morton Foelak
*Attorney, Agent, or Firm*—Sughrue, Mion, Zinn, Macpeak & Seas

[57] ABSTRACT

A method for producing polyester foamed articles comprising: heating and foaming a resin composition comprising a foaming agent, and an aliphatic polyester having a melt viscosity of $1.0 \times 10^3$–$1.0 \times 10^6$ poises at a temperature of 190° C. and a shear rate of 100 sec$^{-1}$, and having a melting point of 70°–190° C. Extrusion or forming in a mold using preexpanded beads can be applied. The foamed articles such as insulating boxes and cushioning materials have biodegradability and excellent mechanical properties such as tensile strength and cushioning properties.

22 Claims, No Drawings

POLYESTER FOAMED ARTICLES AND METHOD FOR PRODUCING THE SAME

BACKGROUND OF THE INVENTION

1. Field of the Invention

The present invention relates to polyester foamed articles prepared by using aliphatic polyesters with biodegradability and sufficiently high molecular weights and specific melt properties for practical use. More particularly, the present invention relates to a method for producing foamed articles by extrusion or mold forming using expandable particles (beads) and foamed articles produced thereby.

2. Discussion of the Background

Recently, although plastic foamed articles characterized by their lightness, elasticity, moldability, etc. are being used mainly as packaging materials, cushioning materials, etc., there is a great community problem in that the resulting waste of the large amounts of plastics used in these materials are hard to dispose of and can pollute rivers, oceans, and soil. To prevent such pollution the development of biodegradable plastics has been desired; for example, poly(3-hydroxybutylate) produced by fermentation methods using microorganisms, blends of general-purpose plastics and starch, a naturally occurring polymer, and the like are already known. The former polymer has a drawback in that it is poor in molding properties because the polymer has a heat decomposition temperature close to its melting point and a raw material efficiency is very bad because it is produced by microorganisms. On the other hand, since the naturally occurring polymer of the latter does not by itself have thermoplasticity, the polymer has defects in molding properties, and is greatly limited in its range of application.

On the other hand, although it is known that aliphatic polyesters are biodegradable, they have hardly been used because polymeric material sufficient enough to obtain practical molded product cannot be obtained. Recently, it has been found that a ring-opening polymerization of ε-caprolactone produces a higher molecular weight polymer, and proposed to use the polymer as a biodegradable resin. However, the resulting polymer is limited to only special applications because of a low melting point of 62° C. and a high cost thereof. Further, although glycolic acid, lactic acid and the like are polymerized by a ring-opening polymerization of glycolide and lactide thereof to obtain polymers with higher molecular weights so as to be sometimes used as medical fibers and the like, the polymers are not used in great amounts as packaging materials, cushioning materials and the like because their decomposition temperatures are close to their melting point and they have defects in their molding properties.

Materials generally used for molding foamed articles are polystyrene or polyethylene. These materials are mixed with foaming agents and then formed to the foamed articles by extruding or molding in a mold.

A material such as styrene polymer containing 0.5~40 parts by weight of a volatile foaming agent, such as propane, butane, pentane, methyl chloride, or dichlorofluoromethane, are known as expandable beads. When heated to a temperature not lower than their softening point, these expandable beads become pre-expanded beads in which a large number of small cells have been generated. A method of producing foamed articles is known, according to which a closed-but-nonairtight type mold having a large number of small holes in its walls and a configuration which is the same as that of the final product is filled with the above pre-expanded beads, and a heating medium, such as steam, is sprayed onto the beads through the above-mentioned small holes to heat them to a temperature not less than their softening point, thereby causing the beads to be expanded and fused to each other so as to produce a porous-styrene-polymer foam having exactly the same shape as the above mold.

On the other hand, the foamed polystyrene articles generate combustion heat as high as 9,500 kcal/kg, so a fear to harm an incinerator is accompanied.

Usually, polystyrene is used in the production of such expandable beads, and even polyethylene terephthalate, which is a condensation product of ethylene glycol and a terephthalic acid (inclusive of dimethylterephthalate), a high-molecular-weight polyester (which means here one having a number average molecular weight of at least 10,000) that is being applied to general packing uses, is not used in this field, and there has been no reported attempt to impart biodegradability to such materials.

Thus, there has been absolutely no technical concept of attempting to put to practical use expandable beads formed from a biodegradable aliphatic polyester based on an aliphatic-type dicarboxylic acid.

One of the reasons for the absence of a concept of putting such foamed articles into practical use is that even in a crystalline condition, most of such aliphatic polyesters have a melting point not higher than 100° C. although special production conditions and physical properties are required with regard to the above expandable beads. Further, they have poor stability when melted. What is more important, the properties of these aliphatic polyesters, particularly the mechanical properties thereof, such as tensile strength, are markedly poor even with a number average molecular weight which is of the same level as the above-mentioned polyethylene telephthalate, so that it has been difficult to even imagine the possibility of obtaining from such materials a molding which must exhibit high strength.

Also it is to be assumed that this is partly attributable to the fact that studies toward the possibility of attaining an improvement in physical properties by increasing the number average molecular weight of such aliphatic polyesters have not progressed to a satisfactory degree yet due to the poor thermal stability of such polyesters.

It is an object of this invention to provide polyester foamed articles which contain an aliphatic polyester as mentioned above, which have a sufficiently high molecular weight for practical uses, which excel in mechanical properties such as thermal stability and tensile strength, and which exhibit biodegradability as a disposal means, that is, which can be decomposed by microorganisms or the like, thereby facilitating the disposal thereof after use.

SUMMARY OF THE INVENTION

After examining various reaction conditions for obtaining a polyester which provides foamed articles having a high molecular weight and a sufficient level of practicability, the present inventors have found that foamed articles by using a particular aliphatic polyester which has a sufficiently high molecular weight for practical use while retaining its biodegradability, provides excellent thermal stability and mechanical strength, to say nothing of the above-mentioned biodegradability, thereby attaining the present invention.

More specifically, the present invention provides (A) a method for producing foamed articles from an aliphatic polyester having melting point of 70°–190° C. and melt viscosity of $1.0 \times 10^3$–$1.0 \times 10^6$ poises at 190° C. and a shear rate of 100 sec$^{-1}$ by using easily volatile or heat-decomposing foaming agents or optionally with cross-linking agents.

Further the present invention provides (B) expandable beads consisting of aliphatic polyester of having melting point of 70°–190° C. and melt viscosity of $1.0 \times 10^3$–$1.0 \times 10^6$ poises at 190° C. and a shear rate of 100 sec$^{-1}$ and easily volatile foaming agent.

Still further the present invention provides (C) an insulating box or cushioning materials which are made by preexpanding said expandable beads followed by foaming in a mold.

DETAILED DESCRIPTION OF THE INVENTION

The present invention will be described below in further detail.

The aliphatic polyester of the present invention mainly consists of a polyester obtained by reacting two components of glycols and dicarboxylic acid (or acid anhydrides thereof), and if necessary as a third component, with at least one polyfunctional component selected from the group consisting of trifunctional or tetrafunctional polyols, oxycarboxylic acids, and polybasic carboxylic acids (or acid anhydrides thereof). The aliphatic polyesters are prepared by reacting relatively high molecular weight polyester prepolymers which have hydroxyl groups at ends with a coupling agent so as to make them even higher molecular weight polymer.

It has been known to obtain polyurethane by reacting a low molecular weight polyester prepolymer having a number-average molecular weight of 2,000–2,500, which have hydroxyl groups as the terminal groups, with diisocyanate as a coupling agent in the preparation of rubbers, foams, coatings and adhesives.

However, the polyester prepolymers used in these polyurethane foams, coatings and adhesives are prepolymers having a low molecular weight and a number-average molecular weight of 2,000–2,500 which is the maximum that can be prepared by non-catalytic reaction. To obtain practical physical properties as the polyurethane, it is necessary that the content of diisocyanate should be as much as 10–20 parts by weight in relation to 100 parts by weight of this low molecular weight prepolymer. When such a large amount of diisocyanate is added to the low molecular weight polyester melted at 150° C. or higher, gelation occurs so that no normal resins which can be molded in the form of a melt can be obtained.

Therefore, polyesters which are obtained by reacting a large amount of diisocyanate with a low molecular weight polyester prepolymers as a raw material cannot be used as the plastic raw material for the method for producing a foamed articles of the present invention.

Also, as shown in the case of polyurethane rubbers, although a method is coceivable in which hydroxyl groups are converted into isocyanate groups by the addition of diisocyanate, and then the number-average molecular weight thereof is further increased by using glycols, the same problem as mentioned above arises because 10 parts by weight of diisocyanate relative to 100 parts by weight of the prepolymer should be used in order to obtain practical physical properties.

When a relatively high molecular weight polyester prepolymer is to be used, heavy metal catalysts required to prepare the prepolymer would promote the reactivity of the above-mentioned isocyanate groups to undesirably cause poor preservativity, generation of cross-linking and branching; hence a number-average molecular weight of not more than around 2,500 of polyester prepolymers would be the limit if they were to be prepared without catalysts.

The polyester prepolymers to obtain the aliphatic polyesters used in the present invention are relatively high molecular weight saturated aliphatic polyesters having substantially hydroxyl groups at the ends thereof, number-average molecular weights of at least 5,000, preferably at least 10,000, and melting point of 60° C. or higher, which are obtained by reacting glycols and dibasic carboxylic acids (or acid anhydrides thereof) in the presence of catalysts. When a prepolymer having a number-average molecular weight of lower than 5,000 is used, the small amounts of 0.1–5 parts by weight of coupling agents used in the present invention cannot provide polyesters for blowmolding having good physical properties. When polyester prepolymers having number-average molecular weights of 5,000 or higher are used, with hydroxyl values of 30 or less, the use of small amounts of coupling agents even under severe conditions such as a molten state and the like can produce high molecular weight polyesters without gelation as the reaction is not affected by remaining catalyst.

Therefore, the polymer for the foamed articles of the present invention has a repeated chain structure in which a polyester prepolymer having a number-average molecular weight of 5,000 or more, preferably 10,000 or more and consisting of an aliphatic glycol and aliphatic dicarboxylic acid is combined through the urethane bonds derived from, for example, diisocyanate as a coupling agent.

Further, the polymer for the foamed articles of the present invention has a repeated chain structure in which the above-mentioned polyester prepolymer provided with branched long chains derived from polyfunctional components is repeatedly combined through the urethane bonds derived from, for example, diisocyanate as a coupling agent. When oxazoline, epoxy compounds, and acid anhydrides are used as a coupling agent, the polyester prepolymer has a repeated chain structure through ester bonds.

The foamed articles of the present invention consisting of an aliphatic polyester having a melt viscosity of $1.0 \times 10^3$–$1.0 \times 10^6$ poises at a temperature of 190° C. at a shear rate of 100 sec$^{-1}$ and a melting point of 70°–190° C., particularly the foamed articles of the present invention which consists of an aliphatic polyester obtained by reacting 0.1–5 parts by weight of diisocyanate with 100 parts by weight of an aliphatic polyester prepolymer having a number-average molecular weight of 5,000 or higher and a melting point of 60° C. or higher has biodegradability when buried in the earth; and has excellent in heat insulation and cushioning properties.

Examples of glycols which can be used as a reaction component include aliphatic glycols. Among them those having a straight chain alkylene group with even number carbon atoms of 2, 4, 6, 8 and 10 such as: ethylene glycol, 1,4-butanediol, 1,6-hexanediol, 1,8- octanediol, 1,10-decanediol, and mixtures thereof are preferable.

Of these glycols, those having a smaller number of carbon atoms, such as ethylene glycol, 1,4-butanediol and 1,6-hexanediol, are preferable because they can produce an aliphatic polyester having a high crystallinity and a high melting point. In particular, ethylene glycol and 1,4-butanediol are most suitable because they produce good results.

Examples of aliphatic dicarboxylic acids or anhydrides thereof which provide aliphatic polyester by reacting with glycols include aliphatic dicarboxylic acids. Among them those having a straight chain alkylene group with even number carbon atoms of 2, 4, 6, 8 and 10 such as: succinic acid, adipic acid, suberic acid, sebacic acid, 1,10-decanedicarboxylic acid, succinic anhydride and mixtures thereof are preferable. Of these dicarboxylic acids, those having a smaller number of carbon atoms, such as succinic acid, adipic acid and succinic anhydride, are preferable because they can produce an aliphatic polyester having high crystallinity and high melting points. In particular, succinic acid, succinic anhydride and an acid mixture of succinic acid or succinic anhydride and another dicarboxylic acid such as adipic acid, suberic acid, sebacic acid or 1,10-decanedicarboxylic acid are preferable.

In the system of an acid mixture containing two or more acid components, for example, succinic acid and other dicarboxylic acids, the mixing ratio of succinic acid is at least 70 mol %, preferably at least 90 mol %, and the mixing ratio of the other carboxylic acids is 30 mol % or less, preferably 10 mol % or less.

A combination of 1,4-butanediol and succinic acid or succinic anhydride and a combination of ethylene glycol and succinic acid or succinic anhydride are particularly preferable for the present invention because the combinations exhibit melting points close to that of polyethylene. (Third component)

To these glycols and dicarboxylic acid, if necessary, may be added as a third component at least one polyfunctional component selected from the group consisting of trifunctional or tetrafunctional polyols, oxycarboxylic acid, and polybasic carboxylic acids (or acid anhydrides thereof). The addition of this third component, which causes the branching of long chains, can impart desirable properties in molten state to the polyester prepolymer, because the ratio of weight-average molecular weight (MW)/number-average molecular weight (Mn), i.e., the molecular weight distribution, increases with increases in its molecular weight.

In terms of the amount of polyfunctional components to be added without fear of gelation, a trifunctional component of 0.1–5 mole %, or a tetrafunctional component of 0.1–3 mole % is added relative to 100 mole % of the total of aliphatic dicarboxylic acid (or acid anhydride thereof) components.

Polyfunctional components

Examples of polyfunctional components as the third component include trifunctional or tetrafunctional polyols, oxycarboxylic acids, and polybasic-carboxylic acids.

The trifunctional polyols representatively include trimethylol propane, glycerin or anhydrides thereof. The tetrafunctional polyols representatively include pentaerythritol.

The trifunctional oxycarboxylic acid components are divided into the two types of (i) a component which has two carboxyl groups and one hydroxyl group in one molecule, and (ii) another component which has one carboxyl group and two hydroxyl groups in one molecule. Malic acid which has two carboxyl groups and one hydroxyl group in one molecule becomes practical and sufficient to the purposes of the present invention in view of commercial availability at low cost.

The tetrafunctional oxycarboxylic acid components are the following three types of components:

(i) A component which has three carboxyl groups and one hydroxyl group in one molecule;

(ii) Another component which has two carboxyl groups and two hydroxyl group in one molecule; and (iii) The remaining component which has three hydroxyl groups and one carboxyl group in one molecule. Any type can be used, though in view of commercial availability at low cost, citric acid and tartaric acid are practical and sufficient to the purposes of the present invention.

As a trifunctional polybasic carboxylic acid (or acid anhydride thereof) component trimesic acid, propane tricarboxylic acid and the like can be used. Among them, trimesic anhydride is practical for the purposes of the present invention.

As a tetrafunctional polybasic carboxylic acid (or anhydride thereof) various types of aliphatic compounds, cycloaliphatic compounds, aromatic compounds and the like, described in certain literatures, can be used. In view of commercial availability, for example, pyromellitic anhydride, benzophenone tetracarboxylic anhydride and cyclopentane tetracarboxylic anhydride are practical and sufficient to the purposes of the present invention.

These glycols and dibasic acids are mainly consisted of aliphatic series, while small amounts of other components, for example, aromatic series may be concomitantly used. These other components may be blended or copolymerized in amounts up to 20% by weight, preferably up to 10% by weight, and more preferably up to 5% by weight because using these compounds degrades biodegradability.

The polyester prepolymer for aliphatic polyesters to be used in the present invention has hydroxyl groups at the terminals. To introduce the hydroxyl groups, it is necessary that glycols are used somewhat excessively.

For preparation of the polyester prepolymer having a relatively high molecular weight, it is necessary to use deglycol-reaction catalysts in the deglycol reaction subsequent to the esterification. Examples of the deglycol-reaction catalysts include titanium compounds such as acetoacetoyl type titanium chelate compounds and organic alkoxy titanium compounds and the like. These titanium compounds can be used in combination. Examples of compounds used in combination include diacetoacetoxy oxytitanium (Nippon Chemical Industry Co., Ltd.; Nursem Titanium) tetraethoxy titanium, tetrapropoxy titanium, tetrabutoxy titanium and the like. The amount of the titanium compound used is 0.001–1 part by weight, and preferably 0.01–0.1 part by weight relative to 100 parts by weight of the polyester prepolymer. These titanium compounds may be blended before the esterification, or may be blended immediately before the deglycol-reaction.

To the polyester prepolymer which has a number-average molecular weight of at least 5,000, preferably at least 10,000, and whose terminal groups are substantially hydroxyl groups are added coupling agents in order to increase its number-average molecular weight.

Examples of the coupling agents include diisocyanate, oxazoline, diepoxy compounds, acid anhydrides and the like. Diisocyanate is particularly preferred.

In the cases of oxazoline and diepoxy compounds, it is necessary that the terminal hydroxyl groups are reacted with acid anhydrides and the like to convert them into carboxyl groups, then coupling agents are used.

Although not limited, examples of diisocyanate include 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate, isophorone diisocyanate and the like. Particularly, hexamethylene diisocyanate is preferably used in terms of hue of prepared resins, reactivity at the time of blending polyesters, and the like.

The adding amounts of these coupling agents are 0.1-5 parts by weight, and preferably 0.5-3 parts by weight relative to 100 parts by weight of polyester prepolymer. Addition of less than 0.1 part by weight causes insufficient coupling reaction, whereas with more than exceeds 5 parts by weight gelation tends to occur.

The addition is preferably performed when the polyester is in a uniformly melted state under easily stirrable conditions. Although it is not impossible for the coupling agents to be added to the polyester prepolymer in the solid state and melted and mixed through an extruder, adding the agents in a polyester preparation unit, or adding them to polyester prepolymer in a melt state (for example, in a kneader) is more practical.

An aliphatic polyester used according to the present invention needs to have a specific melt characteristic in order to be formed into foamed articles by using a foaming agent. Accordingly, the melt viscosity thereof at a temperature of 190° C. and a shear rate of 100 sec$^{-1}$ should be $1.0\times10^3$–$1.0\times10^6$ poises, preferably $5.0\times10^3$–$5.0\times10^5$ poise, and more preferably $7.0\times10^3$–$1.0\times10^5$ poises.

A melt viscosity of less than $1.0\times10^3$ poise leads to too low a viscosity to form cells, whereas a melt viscosity of more than $1.0\times10^6$ poise leads to too high a viscosity to grow cells, so that a foam suitable for practical usage cannot be obtained.

The melt viscosity at a shear rate of 100 sec$^{-1}$ was calculated of 100 sec$^{-1}$ was calculated from a graph which shows the relationship between the apparent viscosities and the shear rates measured by a capillary rheometer using a nozzle having a diameter of 1.0 mm and L/D of 10 at a resin temperature of 190° C.

The melting point of the aliphatic polyester to be used in the present invention needs to be 70°–190° C. preferably 70°–150° C., and more preferably 80°–135° C. A melting point lower than 70° C. will give foamed articles poor heat resistance to distort them, whereas with higher than 190° C. it is difficult to carry out foaming.

To achieve a melting point higher than 70° C. the polyester prepolymer need to have a melt temperature of at least 60° C.

When urethane bonds are contained in the aliphatic polyester to be used in the present invention, the amount of urethane bonds is 0.03-3.0% by weight, preferably 0.05-2.0% by weight, and more preferably 0.1-1.0% by weight.

The amount of urethane bonds is measured by $^{13}$C NMR, showing good correlation with the charged amount.

Less than 0.03% by weight of urethane bonds has a little effect on polymerization and leads to poor molding properties, whereas more than 3% by weight causes gelation.

It is needless to say that when the above-mentioned aliphatic polyester is used to obtain the foamed articles according to the present invention, if necessary, lubricants, waxes, coloring agents and crystallizing promoters as well as antioxidants, thermal stabilizers, UV absorbers, reinforcing fibers and the like can be used concomitantly.

That is, antioxidants include hindered phenol antioxidants such as p-tert-butyl hydroxytoluene and p-tert-butyl hydroxyanisole, sulfur antioxidants such as distearyl thiodipropionate and dilauryl thiodipropionate, and the like; heat stabilizers include triphenyl phosphite, trilauryl phosphite, trisnonylphenyl phosphite and the like; UV absorbers include p-tert-butyl phenyl salicylate, 2-hydroxy-4-methoxybenzophenone, 2-hydroxy-4-methoxy-2'-carboxybenzophenone, 2,4,5-trihydroxybutylophenone and the like; lubricants include calcium stearate, zinc stearate, barium stearate, sodium palmitate and the like; antistatic agents include N,N-bis(hydroxyethyl) alkyl amine, alkyl amine, alkyl allyl sulfonate, alkyl sulfonate and the like; flame retarders include hexabromocyclododecane, tris-(2,3-dichloropropyl) phosphate, pentabromophenyl allyl ether and the like; inorganic fillers include calcium carbonate, silica, titanium oxide, talc, mica, barium sulfate, alumina and the like; crystallizing promoters include polyethylene terephthalate, poly-trans-cyclohexane dimethanol terephthalate and the like; reinforcing fibers include inorganic fibers such as glass fiber, carbon fiber, boron fiber, silicon carbide fiber, graphite fiber, alumina fiber and amorphous fiber, and organic fibers such as aramide fiber, and the like.

FOAMING

Foaming by volatile foaming agents

Examples of the volatile foaming agent used in the present invention include: aliphatic hydrocarbons, such as propane, butane, pentane, isobutane, neopentane, isopentane, hexane, and butadiene, and further, halogenated hydrocarbons, such as methylchloride, methylenechloride, dichlorofluoromethane, chlorotrifluoromethane, dichlorodifluoromethane, chlorodifluoromethane, and trichlorofluoromethane.

To produce a foam by using such an aliphatic polyester and the above mentioned volatile foaming agent as the main components, a material containing the aliphatic polyester as the main component is melted and kneaded by an extruder while adding the volatile foaming agent thereto, or the granular material is impregnated with the volatile foaming agent (pre-expanded beads) and then extruded into the atmosphere from the extruder. In this way, it is possible to produce a foam having an expansion ratio of 1.02-50.

An expansion ratio which is less than 1.02 does not provide the requisite features as a foam, whereas an expansion ratio which is more than 50 results in the cells becoming continuous, which leads to excessive surface irregularities, so that a foam suitable for practical use cannot be obtained.

It is necessary for the kneading temperature to be not less than the melting point of the aliphatic polyester. The kneading temperature is preferably 100° C.–270° C. and, more preferably, 100° C.–250° C. A kneading temperature lower than 100° C. leads to too high a viscosity, so that the kneading is difficult to perform, whereas a kneading temperature higher than 270° C. results in a degeneration of the resin.

Further, the expandable beads can be pre-expanded, foamed in a mold to produce foamed articles of desired shape.

Foamed articles generate heat of 7,000 kcal/kg or less, so errosion of an incinerator can be minimized. The combustion calorific value is measured by the calorimeter method of JIS M8814.

Foaming by heat-decomposing agent

The heat-decomposing foaming agent used in the present invention is selected from various agents of organic and inorganic types. Examples of the organic foaming agent include: azodicarbonamide, N,N'-dinitrosopentamethylene tetramine, and P-P'-oxybisbenzenesulfonyl hydrazide. Examples of the inorganic foaming agent include: sodium bicarbonate, ammonium carbonate, ammonium bicarbonate, and calcium azide.

The expansion ratio is normally 1.02–30.00.

A foam consisting of such an aliphatic polyester and having an expansion ratio of 1.02–30.00 can be produced by mixing 100 parts by weight of the aliphatic polyester with 0.5–30 parts by weight of the heat-decomposing foaming agent and heating the mixture to a temperature not lower than the decomposition temperature of the foaming agent during or after mixing.

An expansion ratio which is less than 1.02 does not provide the requisite features as a foam, whereas an expansion ratio which is more than 30 results in the bubbles becoming continuous, which leads to excessive surface irregularities, so a foam suitable for practical uses cannot be obtained.

The kneading for dispersing the foaming agent can be performed by any well-known method. Preferably, a kneader, roll or extruder is used for the purpose. It is necessary for the kneading temperature to be not less than the melting point of the aliphatic polyester. The kneading temperature is preferably 100° C.–270° C. and, more preferably, 150° C.–250° C. When kneading at a temperature not lower than the decomposition temperature of the foaming agent, it is necessary to perform the kneading under pressure. A kneading temperature lower than 100° C. leads to too high a viscosity, so that the kneading is difficult to perform, whereas a kneading temperature higher than 270° C. results in a deterioration of the resin.

The heating for decomposing the foaming agent can be performed by using a heating device, such as an extruder, press, hot blast stove, infrared heating furnace, or molten salt furnace.

In particular, when heating by using an extruder, press or the like with pressure being applied, a foam can be obtained through a pressure reduction to normal pressure.

Foaming by co-using of cross-linking agent

The cross-linking agent used in the present invention is an organic peroxide whose decomposition temperature is not lower than the melting point of the resin, for example, dicumylperoxide, cumenehydroperoxide, methylethylketone peroxide, or t-butylperoxyisopropylcarbonate.

A foam consisting of such an aliphatic polyester and having an expansion ratio of 2 or more can be produced by mixing 100 parts by weight of the aliphatic polyester with 0.5–10 parts by weight of the heat-decomposing foaming agent and 0.01–30 parts by weight of the cross-linking agent and heating the mixture to a temperature not lower than the decomposition temperature of the cross-linking agent and that of the foaming agent during or after the mixing.

The expansion ratio is not less than 1.02 and not more than 50.

The kneading for dispersing the foaming agent can be performed by any well-known method. It is necessary for the kneading temperature to be not lower than the melting point of the aliphatic polyester and not higher than the decomposition temperature of the cross-linking agent. The kneading temperature is preferably 100° C.–270° C. and, more preferably, 100° C.–250° C.

Further, in the present invention, it is also possible to effect cross-linking by means of an ionizing radiation, such as electron rays, beta rays, or gamma rays.

When effecting cross-linking by radiation, 1 Mrad to 50 Mrad of the radiation is applied in an $N_2$ atmosphere so as to avoid a degeneration of the resin. A radiation amount of less than 1 Mrad does not cause cross-linking, whereas a radiation amount of more than 50 Mrad results in a marked degeneration of the resin. The thickness of the resin is preferably 1 mm or less and, more preferably, 5 mm or less. A thickness of more than 1 mm does not allow the radiation to reach the inner portion, resulting in the inner bubbles becoming bulky and nonuniform at the time of expansion.

Expandable beads, Pre-expansion, Foaming in a Mold

The average radius of the aliphatic polyester particles for forming the expandable beads of this invention is preferably 0.05–10 mm, more preferably, 0.2–6 mm, and most preferably, 0.3–3 mm.

A particle diameter of less than 0.05 mm results in the mold being too closely filled with the beads, so that the heating of the inner portion thereof becomes insufficient. A particle diameter of greater than 10 mm results in the mold not being sufficiently filled with beads, which leads to a deterioration in appearance.

It is necessary for the volatile foaming agent used in the present invention to have a boiling point which is not higher than the melting point of the aliphatic polyester and which does not causes the aliphatic polyester to dissolve or only causes it to swell slightly.

When the volatile foaming agent has a boiling point which is higher than the melting point of the resin or causes it to dissolve, volatilization occurs after the resin has been completely melted or dissolved, so that it is impossible to obtain uniform, fine cells.

The expandable beads can be produced by suspending the aliphatic polyester particles in water, forcing the volatile foaming agent into the water while stirring, and heating the mixture.

When molded after being subjected to pre-expansion at the expansion ratio of 5 or more, the expandable beads of the present invention enable foam products of high expansion ratio to be produced.

After expanding the expandable beads of the present invention by steam heating at an expansion ratio of 5 or more, drying and aging the expanded particles, filling a mold with the particles thus obtained, and further heating it by steam, a foamed product of a high expansion ratio having exactly the same shape as the mold can be obtained.

The mold to be used has to have an inner cavity of desired shape which is provided with a large number of holes or slits whereby heating medium such as steam can be sprayed. In short, the mold should be "closed-but-nonairtight". The foam product is useful as material for food containers, such as for dried noodle soup, as cushioning material for use when transporting television sets, stereos, etc., as material for fish boxes, heat insulating boxes, cold storage boxes, and the like.

The term "insulated box" in this specification is used to mean a box which is used in transporting or storing food, beverages or medicines, in particular fish, meat and vegetables, in a chilled or frozen state. Thus, the box is made of a material having a high thermal insulating effect, in order to prevent the temperature of the interior of the box from rising easily. The insulated box is composed of a box body alone or a box body and a cover which closes an open upper portion of the box body. One of the most important requisites for the insulated box is that the box material have a large thermal insulating effect. The insulated box in this specification should also be understood as covering so-called "heat preserving boxes" which function to prevent the temperature of the contents from coming down.

The insulated box in accordance with the present invention can easily be decomposed by microorganisms and exhibits superior heat insulating effects, while exhibiting sufficient mechanical strength for practical use.

The heat conductivity as a practical characteristic of the insulated box is measured in accordance with JIS A-1412, and should be 0.1 (kcal/mh°C.) or less, preferably 0.08 (kcal/mh°C.) or less and suitably 0.06 (kcal/mh°C.). Heat conductivity exceeding 0.1 (kcal/mh°C.) is not preferred because such value of heat conductivity impractically impairs the important role of the insulated box, e.g., preservation of the freshness of fish.

The term "cushioning medium" in this specification is a material which reduces external impacting force to prevent damaging or breakage of articles such as electric appliances, e.g., televisions and radios, precision devices, e.g., computers and clocks, optical instruments, e.g., glasses, microscopes, and other articles such as glass ware and ceramics. The cushioning medium encloses such articles per se or is placed between the article and a packaging container such as a cardboard carton.

The cushioning medium in accordance with the present invention exhibits combustion calorific value smaller than that of polystyrene, can be easily decomposed by microorganisms and exhibits superior creep characteristics, while exhibiting sufficient mechanical strength for practical use.

The creep characteristic as the practical property of the cushioning medium is represented in terms of compression creep as measured in accordance with JIS K-6767 after 24-hour loading with 0.1 kg/cm$^2$.

The compression creep exhibited by the cushioning medium of the present invention should be 15% or less, preferably 12% or less and most suitably 10% or less. When the creep exceeds 15%, the cushioning medium is undesirably deformed too much under application of external force, with only a small amount of recovery. That is, the rate of breakage of electronic devices would be increased during transportation.

EXAMPLES

Methods of the present invention are illustrated with reference to the following examples, but the invention is not intended to be limited only thereto.

EXAMPLE 1

A 700 L reactor was purged with nitrogen, then 183 kg of 1,4-butanediol and 224 kg of succinic acid were charged in it. After the temperature was elevated under nitrogen stream, esterification by dehydration condensation was carried out for 3.5 hr at 192°–220° C., and after ceasing nitrogen charge, for further 3.5 hr under reduced pressures of 20–2 mmHg. A sample collected had an acid value of 9.2 mg/g, a number-average molecular weight (Mn) of 5,160 and a weight average molecular weight (Mw) of 10,670. Subsequently, 34 g of tetraisopropoxy titanium, a catalyst, was added at normal pressures under nitrogen stream. The temperature was elevated to carry out a deglycol-reaction at temperatures of 215°–220° C. under reduced pressures of 15–0.2 mmHg for 5.5 hr. A sample collected had a number-average molecular weight (Mn) of 16,800 and a weight average molecular weight (Mw) of 43,600. The yield of resulting polyester prepolymer (A1) was 339 kg except condensate water.

5.42 kg of hexamethylene diisocyanate was added to the reactor containing 339 kg of the polyester prepolymer (A1) to perform a coupling reaction for 1 hr at 180°–200° C. The viscosity was rapidly increased, but no gelation occurred. Then, 1.70 kg of Irganox 1010 (Ciba-geigy) as an antioxidant and 1.70 kg of calcium stearate as a lubricant were added, and the mixture was further stirred for 30 min. The resulting reaction product was extruded into water, and cut by a cutter into pellets. The aliphatic polyester (B1) obtained after drying in a vacuum at 90° C. for 6 hr had a yield of 300 kg.

The obtained polyester (B1) was a slightly ivorylike white, waxy crystal, and had a melting point of 110° C., a number-average molecular weight (Mn) of 35,500 a weight-average molecular weight (Mn) of 170,000, a MFR (190° C.) of 1.0 g/10 min, a viscosity of 230 poises in a 10% orthochlorophenol solution and a melt viscosity of $1.5 \times 10^4$ poises at a temperature of 190° C. at a shear rate of 100 sec$^{-1}$. The average molecular weight was measured by a Shodex GPC System11 (Showa Denko, gel permeation chromatography) using a HFIPA solution containing 5 mmol CF$_3$COONa (concentration of 0.1% by weight) as a medium. A calibration curve was drawn using a PMMA standard sample (Shodex Standard M-75, Showa Denko).

100 parts by weight of polyester (B1) and 0.5 parts by weight of talc were kneaded by a tandem extruder composed of a 40 mmΦ extruder and a 50 mmΦ extruder at a temperature of 160° C. Then, 24 parts by weight of dichlorodifluoromethane per 100 parts by weight of the resin mixture was forced into the extruder halfway along the cylinder of the extruder, and extruded into the atmosphere through a circular die having a caliber of 60 mmΦ and a lip gap of 0.6 mm, at a die temperature of 110° C., thereby producing a foam.

In this way, a foam having an expansion ratio of 40 and a cell diameter of 0.4–0.6 mmΦ was obtained.

The foam was buried in the ground and, after being left there for five months, it decomposed into small lumps.

EXAMPLE 2

A 700 L reactor was purged with nitrogen, then 177 kg of 1,4-butanediol, 198 kg of succinic acid and 25 kg of adipic acid were charged in it. After the temperature was elevated under nitrogen stream, esterification by dehydration condensation was performed for 3.5 hr at 190°–210° C., and after ceasing nitrogen charge, for further 3.5 hr under reduced pressures of 20-2 mmHg. A sample collected had an acid value of 9.6 mg/g, a number-average molecular weight (Mn) of 6,100 and weight-average molecular weight (Mw) of 12,200. Subsequently, 20 g of tetraisopropoxy titanium, a catalyst, was added at normal pressures under nitrogen stream. The temperature was elevated to perform a deglycol-reaction at temperatures of 210°–220° C. under reduced pressures of 15-0.2 mmHg for 7.5 hr. A sample collected had a number-average molecular weight (Mn) of 17,300 and a weight-average molecular weight (Mw) of 46,400. The resulting polyester (A2) had a yield of 337 kg except condensate water.

4.66 kg of hexamethylene diisocyanate was added to the reactor containing 337 kg of polyester (A2) to perform a coupling reaction for 1 hr at 180°–200° C. The viscosity was rapidly increased, but no gelation occurred. Then, 1.70 kg of Irganox 1010 (Ciba-Geigy) as an antioxidant and 1.70 kg of calcium stearate as a lubricant were added, and the mixture was further stirred for 30 min. The resulting reaction product was extruded into water by an extruder, and cut by a cutter into pellets. The aliphatic polyester (B2) obtained after drying in a vacuum at 90° C. for 6 hr had a yield of 300 kg.

The obtained polyester (B2) was a slightly ivory-like white, waxy crystal, and had a melting point of 103° C., a number-average molecular weight (Mn) of 36,000, a weight-average molecular weight (Mw) of 200,900, a MFR (190° C.) of 0.52 g/10 min, a viscosity of 680 poises in a 10% orthochlorophenol solution and a melt viscosity of $2.2 \times 10^4$ poises at a temperature of 190° C. at a shear rate of 100 $sec^{-1}$.

100 parts by weight of polyester (B2) and 0.5 parts by weight of talc were kneaded by a tandem extruder composed of a 40 mmΦ extruder and a 50 mmΦ extruder at a temperature of 160° C. Then, 18 parts by weight of dichlorodifluoromethane per 100 parts by weight of the resin mixture was forced into the extruder halfway along the cylinder of the extruder, and extruded into the atmosphere through a circular die having a caliber of 60 mmΦ and a lip gap of 0.6 mm, at a die temperature of 110° C., thereby producing a foam.

In this way, a foam having an expansion ratio of 30 and a cell diameter of 0.4–0.6 mmΦ was obtained.

The foam was buried in the ground and, after being left there for five months, it decomposed into small lumps.

EXAMPLE 3

A 700 L reactor was purged with nitrogen, then 200 kg of 1,4-butanediol, 250 kg of succinic acid and 2.8 kg of trimethylol propane were charged in it. After the temperature was elevated under nitrogen stream, esterification by dehydration condensation was performed for 4.5 hr at 192°–220° C., and after ceasing nitrogen charge, for further 5.5 hr under reduced pressures of 20-2 mmHg. A sample collected had an acid value of 10.4 mg/g, a number-average molecular weight (Mn) of 4,900 and a weight average molecular weight (Mw) of 10,000. Subsequently, 37 g of tetraisopropoxy titanium, a catalyst, was added at normal pressures under nitrogen stream. The temperature was elevated to perform a deglycol-reaction at temperatures of 210°–220° C. under reduced pressures of 15-1.0 mmHg for 8 hr. A sample collected had a number-average molecular weight (Mn) of 16,900 and a weight-average molecular weight (Mw) of 90,300 (Mw/Mn=5.4). The resulting polyester (A3) had a yield of 367 kg except condensate water of 76 kg.

3.67 kg of hexamethylene diisocyanate was added to the reactor containing 367 kg of polyester (A3) to perform a coupling reaction for 1 hr at 160°–200° C. The viscosity was rapidly increased, but no gelation occurred. Then, 367 g of Irganox 1010 (Ciba-Geigy) as an antioxidant and 367 g of calcium stearate as a lubricant were added, and the mixture was further stirred for 30 min. The resulting reaction product was extruded into water by an extruder, and cut by a cutter into pellets. The polyester (B3) obtained after drying in a vacuum at 90° C. for 6 hr had a yield of 350 kg.

The obtained polyester (B3) was a slightly ivorylike white, waxy crystal, and had a melting point of 110° C., a number-average molecular weight (Mn) of 17,900 a weight-average molecular weight (Mw) of 161,500 (Mw/Mn=9.0), a MFR (190° C.) of 0.21 g/10 min and a melt viscosity of $2.0 \times 10^4$ poises at a temperature of 190° C. at a shear rate of 100 $sec^{-1}$.

The polyester (B1) was formulated as in Example 1 and foamed to produce foamed article having an expansion ratio of 40 times, cell diameter of 0.3–0.5 mmΦ.

The foam was buried in the ground and, after being left there for five months, it decomposed into small lumps.

COMPARATIVE EXAMPLE 1

Polyester (A1) was molded under the same conditions as in Example 1, without succeeding in obtaining bubbles having a stable configuration, so a foam that could be put to practical uses could not be obtained.

COMPARATIVE EXAMPLE 2

An attempt was made to mold a commercial polyester (Mn=40,000, polyethylene terephthalate), without succeeding in obtaining a foam. Then, a biodegradability test was conducted using a polyethylene terephthalate film, a condensation product obtained from 13 μm of a commercial terephthalic acid and ethylene glycol. The film exhibited no substantial changes in appearance, thus indicating no biodegradability.

EXAMPLE 4

100 parts by weight of polyester (B1) obtained by Example 1, 4 parts by weight of azodicarbonamide, 0.5 parts by weight of zinc oxide, and 0.5 parts by weight of talc were kneaded by a tandem extruder composed of a 40 mmΦ extruder and a 50 mmΦ extruder at a temperature of 180° C., and then extruded into the atmosphere through a circular die having a width of 300 mm, at a die temperature of 110° C., thereby producing a foam having an expansion ratio of 1.8 and a cell diameter of 0.4–0.6 mmΦ.

The foam thus obtained was buried in the ground and, after being left there for five months, the foam decomposed to reduce its strength such as to make it devoid of practicability.

EXAMPLE 5

100 parts by weight of polyester (B2), 16 parts by weight of azodicarbonamide, 0.5 parts by weight of zinc oxide, and 0.5 parts by weight of talc were kneaded by a tandem extruder composed of a 40 mmΦ extruder and a 50 mmΦ extruder at a temperature of 180° C., and then extruded into the atmosphere through a circular die having a caliber of 60 mm and a lip gap of 0.6 mm, at a die temperature of 90° C., thereby producing a foam having an expansion ratio of 10 and a cell diameter of 0.4–0.6 mmΦ.

The foam thus obtained was buried in the ground and, after being left there for five months, the foam decomposed to reduce its strength such as to make it devoid of practicability.

EXAMPLE 6

A 700 L reactor was purged with nitrogen, then 145 kg of ethylene glycol, 251 kg of succinic acid and 4.1 kg of citric acid were charged in it. After the temperature was elevated under nitrogen stream, esterification by dehydration condensation was performed for 3.5 hr at 190°–210° C., and after ceasing nitrogen charge, for further 5.5 hr under reduced pressures of 20–2 mmHg. A sample collected had an acid value of 8.8 mg/g, a number-average molecular weight (Mn) of 6,800 and a weight-average molecular weight (Mw) of 13,500. Subsequently, 20 g of tetraisopropoxy titanium, a catalyst, was added at normal pressures under nitrogen stream. The temperature was elevated to perform a deglycol-reaction at temperatures of 210°–220° C. under reduced pressures of 15–0.2 mmHg for 4.5 hr. A sample collected had a number-average molecular weight (Mn) of 33,400 and a weight-average molecular weight (Mw) of 137,000. The resulting polyester (A4) had a yield of 323 kg except condensate water.

3.23 kg of hexamethylene diisocyanate was added to the reactor containing 323 kg of polyester (A4) to perform a coupling reaction for 1 hr at 180°–200° C. The viscosity was rapidly increased, but no gelation occurred. Then, 1.62 kg of Irganox 1010 (Ciba-Geigy) as an antioxidant and 1.62 kg of calcium stearate as a lubricant were added, and the mixture was further stirred for 30 min. The resulting reaction product was extruded into water by an extruder, and cut by a cutter into pellets. The polyester (B4) obtained after drying in a vacuum at 90° C. for 6 hr had a yield of 300 kg.

The obtained polyester (B4) was a slightly ivory-like white, waxy crystal, and had a melting point of 96° C., a number-average molecular weight (Mn) of 54,000, a weight-average molecular weight (Mw) of 324,000, a MFR (190° C.) of 1.1 g/10 min, a viscosity of 96 poises in a 10% orthochlorophenol solution and a melt viscosity of $1.6 \times 10^4$ poises at a temperature of 190° C. at a shear rate of 100 sec$^{-1}$.

100 parts by weight of polyester (B4), 5 parts by weight of azodicarbonamide, and 0.5 parts by weight of zinc oxide were kneaded to a sufficient degree by a roll maintained at 110° C. to prepare a plate-like sheet having a size of 2 mm (thick)×200 mm×200 mm, which sheet was heated in an atmosphere at 160° C. by a hot blast stove for six minutes, thereby producing a foam.

In this way, a foam having an expansion ratio of 8 and a cell diameter of 0.4–0.6 mmΦ was obtained.

After burying the foam in the ground and leaving it there for five months, the same results as in the Example 4 were obtained.

EXAMPLE 7

The polyester (B3) used in Example 3 was formulated as in Example 4 and extruded to produce foamed article having a expansion ratio of 2.0 times, a cell diameter of 0.4–0.6 mm Φ.

The foam thus obtained was buried in the earth and, after being left there for five months, the foam deformed badly showing a degradation.

COMPARATIVE EXAMPLE 3

Polyester (A1) was molded under the same conditions as in Example 4. The molding obtained exhibited excessive surface irregularities and bulky, nonuniform cells (having a diameter of 1 mm or more), so a foam could not be obtained which could be put to practical use.

COMPARATIVE EXAMPLE 4

An attempt was made to mold a commercial polyester (Mn=40,000, polyethylene terephthalate consisting of terephthalic acid and ethylene glycol) under the same conditions as in Example 4, without succeeding in obtaining a foam. Then, a biodegradability test was conducted using a polyethylene terephthalate film, a condensation product obtained from 13 μm of a commercial terephthalic acid and ethylene glycol. In the test, the film exhibited no substantial changes in appearance, thus indicating no biodegradability.

EXAMPLE 8

100 parts by weight of polyester (B1) obtained by Example 1, 5 parts by weight of azodicarbonamide, and 0.8 parts by weight of dicumyl peroxide were kneaded by an extruder at a temperature of 120° C., and then extruded through a T-die, thereby producing a sheet having a width of 300 mm and a thickness of 2 mm. Further, this sheet was left to stand in a hot blast stove for five minutes, thereby preparing a foam.

In this way, a foam having an expansion ratio of 10 and a cell diameter of 0.4–0.6 mm Φ was obtained.

The foam thus obtained was buried in the ground and, after being left there for five months, the foam decomposed to such a degree as to suffer marked deformation.

EXAMPLE 9

100 parts by weight of polyester (B2) obtained by Example 2 and 5 parts by weight of azodicarbonamide were kneaded by an extruder at a temperature of 150° C., and extruded through a T-die to prepare a sheet having a width of 300 mm and a thickness of 0.5 mm. Both sides of this sheet were irradiated with an electron rays of 10 Mrad in an $N_2$ gas atmosphere by using an electron ray application machine (Curetron (EBC-200-AA2), an area-beam-type electron ray application machine, manufactured by Nisshin High Voltage Kabushiki Kaisha) and was left to stand in a hot blast stove adjusted to 200° C. for five minutes, thereby producing a foam.

In this way, a foam having an expansion ratio of 10 and a cell diameter of 0.3–0.5 mm Φ was obtained.

After being buried in the ground and left there for five months, the foam thus obtained decomposed to suffer a reduction in strength to such a degree as to be devoid of practicability.

EXAMPLE 10

From the polyester (B3) used in Example 3, a foamed articles having an expansion retio of 10 times, a cell diameter of 0.4–0.6 mm Φ.

The foam thus obtained was buried in the ground and, after being left there for five months, the foam decomposed to such a degree as to suffer marked deformation.

COMPARATIVE EXAMPLE 5

Polyester (A1) obtained by Example 1 was molded under the same conditions as in Example 8. The molding obtained exhibited excessive surface irregularities and bulky, nonuniform bubbles (having a diameter of 1 mm or more), so a foam could not be obtained which could be put to practical use.

EXAMPLE 11

2200 g of pure water was put in a 5.6 L autoclave and equipped with an agitator, and 2200 g of polyester (B1) obtained by Example 1 particles having a size ranging from 28 mesh to 35 mesh in the Teiler standard, 7 g of magnesium oxide, and 0.22 g of dilauryl thiodipropyonate were added to the water. Then, while stirring, 44 g of propane and 186 g of pentane were forced into the autoclave and, after raising the temperature to 100° C., the mixture was allowed to stand for 1.5 hours. Next, after lowering the temperature inside the above system to 30° C., expandable beads of polyester (B1) were extracted from the system. The expandable beads thus obtained were caused to expand at an expansion ratio of 10 to thereby prepare pre-expanded beads. After drying and maturing these pre-expanded beads, a cup-shaped "closed-but-nonairtight" mold having a wall thickness of 3.0 mm was filled with these pre-expanded beads, and heat molding by steam was performed. The cell size distribution range when the expandable beads of polyester (B1) were caused to expand at an expansion ratio of 50 was 0.08–0.30 mm. The burning calorific value was 5,720 kcal/kg.

After being buried in the ground for five months, these expandable beads had been decomposed to lose the bead configuration, to say nothing of the expandability thereof.

EXAMPLE 12

2200 g of pure water was put in an autoclave having a content volume of 5.6 L and equipped with an agitator, and 2200 g of polyester (B2) obtained by Example 2 particles having a size ranging from 9 mesh to 12 mesh in the Teiler standard, and 0.6 g of dodecyl sodium benzenesulfonate were added to the water. Then, while stirring, 44 g of propane and 186 g of pentane were forced into the autoclave and, after raising the temperature to 100° C., the mixture was allowed to stand for 6 hours. Next, after lowering the temperature inside the above system to 30° C., expandable beads of polyester (B3) were obtained and dried through dehydration. The expandable beads obtained were retained at 10° C. for two weeks and then caused to expand by steam at an expansion ratio of 10 to thereby prepare pre-expanded beads. After leaving these pre-expanded beads to stand for 24 hours, a cup-shaped mold having a size of 300 mm×400 mm×100 mm was filled with these pre-expanded beads, and heat molding by steam was performed. The cell size distribution range when the expandable beads of polyester (B3) were caused to expand at an expansion ratio of 50 was 0.1–0.35 mm. The average cell size was 0.2 mm.

After burning these expandable beads in the ground for five months, the same results as those in Example 11 were obtained.

EXAMPLE 13

2200 g of pure water was put in an autoclave having a content volume of 5.6 L and equipped with an agitator, and 2200 g of polyester (B3) obtained by Example 3 particles having a size ranging from 9 mesh to 12 mesh in the Teiler standard, and 0.6 g of dodecyl sodium benzenesulfonate were added to the water. Then, while stirring, 44 g of propane and 186 g of pentane were forced into the autoclave and, after raising the temperature to 100° C., the mixture was allowed to react for 6 hours. Next, after lowering the temperature inside the above system to 30° C., expandable beads of polyester 12 were obtained and dried through dehydration. The expandable beads obtained were retained at 10° C. for two weeks and then caused to expand by steam at an expansion ratio of 10 to thereby prepare pre-expanded beads. After leaving these pre-expanded beads to stand for 24 hours, a cup-shaped mold having a size of 300 mm×400 mm×100 mm was filled with these pre-expanded beads, and heat molding by steam was performed. The cell size distribution range when the expandable beads of polyester 12 were caused to expand at an expansion ratio of 50 was 0.07–0.30 mm. The average cell size was 0.2 mm.

After burning these expandable beads in the ground for five months, the same results as those in Example 11 were obtained.

COMPARATIVE EXAMPLE 6

Polyester (A1) obtained by Example 1 was molded under the same conditions as in Example 11, without succeeding in maintaining the cell diameter. Thus, a foam which could be put to practical uses could not be obtained.

EXAMPLE 14

An autoclave having an internal volume of 5.6 L, equipped with a stirrer, was charged with 2200 g of purified water, as well as 2200 g of pellets of polyester (B1) obtained Example 1 ranging between 28 mesh and 35 mesh in terms of Tyler standard, 7 g of magnesium oxide and 0.22 g of dilauryl thiodipropionate. Subsequently, while stirring the mixture, 44 g of propane and 186 g of pentane were charged under pressure and the mixture was heated to 100° C. and held at this temperature for 1.5 hours. The temperature in the above-described system was then cooled to 30° C., and the reaction product was taken out of the system, whereby foamable pellets of polyester (B1) were obtained. The thus obtained foamable pellets were made to pre-expand at a foaming ratio of 10 by being heated with steam whereby pre-expanded beads were obtained. The pre-expanded beads were then charged in a rectangular mold of 3.0 mm thick, and heated with steam so as to become a insulation box of 80 cm long, 30 cm wide and 30 cm tall. The insulation box 1 thus formed had foamed at a foaming ratio of 50 and had a mean wall thickness of 1.5 cm. The heat conductivity of this insulation box as measured in accordance with JIS A-1412 was 0.02 (kcal/mh°C.).

A test piece was obtained from this chiller box and buried under the ground for 5 months. The test piece was decomposed and changed so much that its original shape could not be recognized.

EXAMPLE 15

As in Example 14, polyester pellets (B2) obtained by Example 2 were made to pre-expanded at a foaming ratio of 10, followed by foaming, at a foaming ratio of 50, thus forming an insulation box. The heat conductivity of this insulation box was measured in the same way as Example 14. The heat conductivity was 0.03 (kcal/mh°C.). The combustion calorific value was 5,850 kcal/kg.

The thus obtained chiller box was kept buried in soil for 5 months. It was confirmed that the box had changed to a box-shaped substance which had no practical strength.

EXAMPLE 16

As in Example 14, polyester pellets (B4) obtained by Example 6 were made to pre-expand at a foaming ratio of 10, followed by foaming, at foaming ratio of 50, thus forming a insulation box. The heat conductivity of this insulation box was measured in the same way as Example 14. The heat conductivity was 0.05 (kcal/mh°C.). The combustion calorific value was 5,850 kcal/kg.

The thus obtained insulation box was kept buried in soil for 5 months. The result was similar to that of Example 15.

EXAMPLE 17

As in Example 14, polyester pellets (B3) obtained by Example 3 were made to pre-expand at a foaming ratio of 10, followed by foaming, at foaming ration of 50, thus forming a insulation box. The heat conductivity of this insulation box was measured in the same way as Example 14. The heat conductivity was 0.04 (kcal/mh°C.). The combustion calorific value was 5,750 kcal/kg.

The thus obtained insulation box was kept buried in soil for 5 months. The result was similar to that of Example 14.

COMPARATIVE EXAMPLE 7

An article was formed from polyester (A1) under the same conditions as Example 14. The article had a large surface roughness, as well as coarse voids of irregular size (greater than 1 mm). Thus, the foamed article obtained was not practically usable.

EXAMPLE 18

An autoclave having an internal volume of 5.6 L, equipped with a stirrer, was charged with 2200 g of purified water, as well as 2200 g of pellets of polyester (B1) obtained by Example 1 ranging between 28 mesh and 35 mesh in terms of Tyler standard, 7 g of magnesium oxide and 0.22 g of dilauryl thiodipropionate. Subsequently, while stirring the mixture, 44 g of propane and 186 g of pentane were charged under pressure and the mixture was heated to 100° C. and held at this temperature for 1.5 hours. The temperature in the above-described system was then cooled to 30° C., and the reaction product was taken out of the system, whereby foamable pellets of polyester (B1) were obtained. The thus obtained foamable pellets were made to pre-expand at a foaming ratio of 10 by being heated with steam whereby pre-expand pellets were obtained. The pre-foam expanded beads were then charged in a rectangular mold for forming a carton for transportation of a cassette tape recorder, and were heated with steam so as to become a cushioning box 20 cm long, 15 cm wide and 8.0 cm tall. The cushioning box thus formed was foamed at a foaming ratio of 50 and had a mean wall thickness of 1.5 cm. The compression creep of this box, as measured in accordance with JIS K-6767, was 13%, while the combustion calorific value was 5,750 kcal/kg.

A tabular test piece obtained from this cushioning box was buried in the ground for 5 months. The test piece was changed into a tubular member having no practical strength, thus exhibiting decomposition.

EXAMPLE 19

As in Example 18, polyester (B2) obtained by Example 2 was made to pre-expand at a foaming ratio of 10, followed by foaming, at foaming ratio of 50, thus forming a tabular member of the cushioning medium. The compression creep of this box, as measured in accordance with JIS K-6767, was 12%, while the burning calorific value was 5,850 kcal/kg.

A tabular test piece obtained from this cushioning box was buried in the ground for 5 months. The test piece was decomposed to such a degree that it was not able to maintain its original shape.

EXAMPLE 20

As in Example 18, polyester (B4) obtained by Example 6 was made to pre-expand at a foaming ratio of 10, followed by foaming, at foaming ratio of 50, thus forming a tabular member of a cushioning medium. The compression creep of the thus obtained tabular member, as measured by the same method as before, was 11%.

The thus obtained insulation box was kept buried in soil for 5 months. The result was similar to that of Example 18.

EXAMPLE 21

As in Example 18, polyester (B3) obtained by Example 3 was made to pre-expand at a foaming ratio of 10, followed by foaming, at foaming ratio of 50, thus forming a tabular member of a cushioning medium. The compression creep of the thus obtained tabular member, as measured by the same method as before, was 13%.

The thus obtained insulation box was kept buried in soil for 5 months. The result was similar to that of Example 18.

COMPARATIVE EXAMPLE 8

An article was formed from polyester (A1) obtained by Example 1 under the same conditions as Example 18. The article has a large surface roughness, as well as coarse voids of irregular size (greater than 1 mm). Thus, the foamed article obtained was not practically usable.

What is claimed is:

1. A method for producing polyester foamed articles comprising:
    obtaining a prepolymer having a number-average molecular weight of at least 10,000 from a reaction of at least an aliphatic glycol and an aliphatic dicarboxylic acid, wherein the reaction includes (a) succinic acid, or its derivatives, reacted with 1,4-butanediol, (b) succinic acid, adipic acid, or their derivatives, reacted with 1,4-butanediol, or (c) succinic acid, or its derivatives, reacted with ethylene glycol;
    adding from 0.1 to 5 parts by weight of diisocyanate to 100 parts by weight of the prepolymer in a molten state to obtain a crystalline aliphatic polyester having a melt viscosity of $1.0 \times 10^3 - 1.0 \times 10^6$ poises at a temperature of 190° C. and a shear rate of 100 sec$^{-1}$, and having a melting point of 70°–190° C.;

adding a foaming agent to the crystalline aliphatic polyester having a melt viscosity of $1.0 \times 10^3$–$1.0 \times 10^6$ poises at a temperature of 190° C. and a shear rate of 100 sec$^{-1}$, and having a melting point of 70°–190° C.; then heating and foaming.

2. A method for producing polyester foamed articles as claimed in claim 1 wherein said foaming agent is a volatile foaming agent.

3. A method for producing polyester foamed articles as claimed in claim 1 wherein said foaming agent is a heat-decomposing foaming agent.

4. A method for producing polyester foamed articles as claimed in claim 1 wherein a heat-decomposing foaming agent and cross-linking agent is added to the polyester.

5. A method for producing polyester foamed articles as claimed in any one of claims 1 to 4 wherein an expansion ratio is 1.02–50.

6. A method for producing polyester foamed articles as claimed in any one of claims 1 to 4 wherein the aliphatic polyester has a number-average molecular weight of at least 10,000 and contains 0.03–3.0% by weight of urethane bonds.

7. A method for producing polyester foamed articles as claimed in any one of claims 1 to 4 wherein the aliphatic polyester has a number-average molecular weight of at least 10,000 and contains 0.05–2.0% by weight of urethane bonds.

8. A method for producing polyester foamed articles as claimed in any one of claims 1 to 4 wherein the aliphatic polyester has a number-average molecular weight of at least 10,000 and contains 0.1–1.0% by weight of urethane bonds.

9. A method for producing polyester foamed articles as claimed in claim 6 wherein the aliphatic polyester is consisting of an aliphatic polyester obtained by reacting 0.1–5 parts by weight of diisocyanate with 100 parts by weight of an aliphatic polyester prepolymer having a number-average molecular weight of at least 10,000 and a melting point of at least 60° C.

10. A method for producing polyester foamed articles as claimed in claim 6 wherein the aliphatic polyester has a repeated chain structure in which a polyester prepolymer having a number-average molecular weight (Mn) of 10,000 or more and consisting of an aliphatic glycol and aliphatic decarboxylic acid, is combined through a urethane bond.

11. A method for producing polyester foamed articles as claimed in claim 6 wherein the aliphatic polyester has a repeated chain structure in which a polyester prepolymer having a number-average molecular weight (Mn) of 10,000 or more and obtained by reacting an aliphatic glycol, aliphatic dicarboxylic acid and, as a third component, at least one polyfunctional component selected from the group consisting of trifunctional or tetrafunctional polyols, oxycarboxylic acids and polybasic carboxylic acids or acid anhydrides thereof, is combined through a urethane bond.

12. A method for producing polyester foamed articles as claimed in claim 10 wherein the polyester prepolymer has a unit selected from the group consisting of succinic acid, adipic acid, succinic anhydride and adipic anhydride as a dicarboxylic acid unit.

13. A method for producing polyester foamed articles as claimed in claim 11 wherein the polyester prepolymer contains one or more compounds selected from the group consisting of trimethylol propane, glycerin and pentaerythritol as the trifunctional or tetrafunctional polyol of the third component.

14. A method for producing polyester foamed articles as claimed in claim 11 wherein the polyester prepolymer contains one or more compounds selected from the group consisting of malic acid, citric acid and tartaric acid as the trifunctional or tetrafunctional oxycarboxylic acid of the third component.

15. A method for producing polyester foamed articles as claimed in claim 11 wherein the polyester prepolymer contains one or more compounds selected from the group consisting of trimesic acid, propane tricarboxylic acid, trimellitic anhydride, pyromellitic anhydride, benzophenone tetracarboxylic anhydride and cyclopentane tetracarboxylic anhydride as the trifunctional or tetrafunctional polybasic carboxylic acid of the third component.

16. Expandable polyester beads comprising: 100 parts by weight of a crystalline aliphatic polyester having a melt viscosity of $1.0 \times 10^3$–$1.0 \times 10^6$ poises at a temperature of 190° C. and a shear rate of 100 sec$^{-1}$, and having a melting point of 70°–190° C.; and 0.5–40 parts by weight of a volatile foaming agent;

wherein said aliphatic polyester is obtained by adding from 0.1 to 5 parts by weight of diisocyanate to 100 parts by weight of a prepolymer in a molten state, wherein said prepolymer is obtained from a reaction of at least an aliphatic glycol and an aliphatic dicarboxylic acid, wherein the reaction includes (a) succinic acid, or its derivatives, reacted with 1,4-butanediol, (b) succinic acid, adipic acid, or their derivatives, reacted with 1,4-butanediol, or (c) succinic acid, or its derivatives, reacted with ethylene glycol, and has a number-average molecular weight of at least 10,000.

17. Expandable polyester beads as claimed in claim 16 wherein the aliphatic polyester has a number-average molecular weight of at least 10,000 and contains 0.03–3.0% by weight of urethane bonds.

18. Expandable polyester beads as claimed in claim 17 comprising: 100 parts by weight of an aliphatic polyester obtained by reacting 0.1–5 parts by weight of diisocyanate with 100 parts by weight of an aliphatic polyester prepolymer having a number-average molecular weight of at least 10,000 and a melting point of at least 60° C.; and 0.5–40 parts by weight of a volatile foaming agent.

19. An insulated box or cushioning medium formed by heating and foaming a resin composition consisting of a foaming agent and a crystalline aliphatic polyester having a melt viscosity of $1.0 \times 10^3$–$1.0 \times 10^6$ poises at a temperature of 190° C. and a shear rate of 100 sec$^{-1}$, and having a melting point of 70°–190° C., wherein said aliphatic polyester is obtained by adding from 0.1 to 5 parts by weight of diisocyanate to 100 parts by weight of a prepolymer in a molten state, wherein said prepolymer is obtained from a reaction of at least an aliphatic glycol and an aliphatic dicarboxylic acid, wherein the reaction includes (a) succinic acid, or its derivatives, reacted with 1,4-butanediol, (b) succinic acid, adipic acid, or their derivatives, reacted with 1,4-butanediol, or (c) succinic acid, or its derivatives, reacted with ethylene glycol, and has a number-average molecular weight of at least 10,000.

20. An insulated box or cushioning medium as claimed in claim 19 wherein the aliphatic polyester has a number-average molecular weight of at least 10,000 and contains 0.03–3.0% by weight of urethane bonds.

21. A method for producing an insulating box or cushioning medium comprising pre-expanding the expandable beads as claimed in any of claims 16 to 18, placing the pre-expanded beads in a closed-but-nonairtight mold, and heating the mold.

22. A method for producing polyester foamed articles as claimed in claim 11 wherein the polyester prepolymer has a unit selected from the group consisting of succinic acid, adipic acid, succinic anhydride and adipic anhydride as a dicarboxylic acid unit.

* * * * *